United States Patent
Cambier

(10) Patent No.: US 8,189,879 B2
(45) Date of Patent: May 29, 2012

(54) SYSTEM AND METHOD FOR ANIMAL IDENTIFICATION USING IRIS IMAGES

(75) Inventor: James L. Cambier, Jupiter, FL (US)

(73) Assignee: Iristrac, LLC, Louisville, KY (US)

( * ) Notice: Subject to any disclaimer, the term of this patent is extended or adjusted under 35 U.S.C. 154(b) by 777 days.

(21) Appl. No.: 12/370,952

(22) Filed: Feb. 13, 2009

(65) Prior Publication Data
US 2009/0208064 A1    Aug. 20, 2009

Related U.S. Application Data

(60) Provisional application No. 61/028,623, filed on Feb. 14, 2008.

(51) Int. Cl.
*G06K 9/00* (2006.01)
(52) U.S. Cl. ............... 382/117; 726/2; 340/5.83
(58) Field of Classification Search .......... 382/100, 382/115, 117, 118, 209–222, 181, 190, 195; 351/200, 206; 340/5.8–5.86, 4; 726/2
See application file for complete search history.

(56) References Cited

U.S. PATENT DOCUMENTS

| | | | |
|---|---|---|---|
| 4,641,349 A * | 2/1987 | Flom et al. ............. | 382/117 |
| 5,291,560 A | 3/1994 | Daugman | |
| 5,572,596 A | 11/1996 | Wildes et al. | |
| 6,081,607 A | 6/2000 | Mori et al. | |
| 6,229,905 B1 | 5/2001 | Suzaki | |
| 6,320,973 B2 | 11/2001 | Suzaki et al. | |
| 6,404,903 B2 | 6/2002 | Okano et al. | |
| 6,424,727 B1 | 7/2002 | Musgrave et al. | |
| 6,594,377 B1 | 7/2003 | Kim et al. | |
| 6,614,919 B1 * | 9/2003 | Suzaki et al. ............ | 382/117 |
| 7,099,495 B2 * | 8/2006 | Kodno et al. ............ | 382/117 |
| 7,248,720 B2 * | 7/2007 | Muller et al. ............ | 382/117 |
| 7,277,561 B2 * | 10/2007 | Shin .................... | 382/117 |

(Continued)

FOREIGN PATENT DOCUMENTS

CN          101042731          9/2007

(Continued)

OTHER PUBLICATIONS

United States Department of Agriculture, "The National Animal Identification System (NAIS)," Program Aid No. 1797 brochure.

(Continued)

*Primary Examiner* — Anand Bhatnagar
(74) *Attorney, Agent, or Firm* — Stites & Harbison, PLLC; Jeffrey A. Haeberlin

(57) ABSTRACT

A system for animal identification includes: an image capture apparatus for obtaining an image of an eye of an animal including a pupil region and an iris region; and a template generation apparatus. The template generation apparatus is for: extracting a set of pixel data from the image, the set of pixel data representing an upper region of interest of the iris region above the pupil region and a lower region of interest of the iris region below the pupil region, the upper region of interest and the lower region of interest have parallel side boundaries that are spaced apart a distance that is substantially independent of a degree of dilation of the pupil region; and transforming the set of pixel data representing the upper region of interest and the lower region of interest into a template of the upper region of interest and the lower region of interest.

20 Claims, 17 Drawing Sheets

U.S. PATENT DOCUMENTS

| | | | |
|---|---|---|---|
| 2001/0017935 A1* | 8/2001 | Suzaki et al. | 382/110 |
| 2006/0165266 A1* | 7/2006 | Hamza | 382/117 |
| 2007/0127781 A1* | 6/2007 | Stewart | 382/110 |
| 2007/0211924 A1* | 9/2007 | Hamza | 382/117 |
| 2008/0025575 A1* | 1/2008 | Schonberg et al. | 382/117 |

FOREIGN PATENT DOCUMENTS

| | | |
|---|---|---|
| EP | 1093633 | 4/2001 |
| JP | 2004288221 | 10/2004 |
| JP | 2007089976 | 12/2007 |
| WO | 9409446 | 4/1994 |
| WO | 9721188 | 6/1997 |
| WO | 9808439 | 3/1998 |
| WO | 0135321 | 5/2001 |

OTHER PUBLICATIONS

Daugman, John G., "High Confidence Visual Recognition of Persons by a Test of Statistical Independence," IEEE Transactions on Pattern Analysis and Machine Intelligence, vol. 15, No. 11, Nov. 1993, pp. 1148-1161.

Gonzales et al., Digital Image Processing Using MATLAB, 2004, pp. 474-476, Pearson Prentice Hall, Upper Saddle River, New Jersey.

Masek, Libor, "Recognition of Human Iris Patterns for Biometric Identification," B. E. Thesis submitted at School of Computer Science and Software Engineering, The University of Western Australia, 2003.

Suzaki et al., "A Horse Identification System Using Biometrics," Systems and Computers in Japan, vol. 32, No. 14, 2001, pp. 12-23.

ISA/KR, International Search Report and Written Opinion of International Patent Application No. PCT/US2009/034034, Jun. 25, 2009.

* cited by examiner

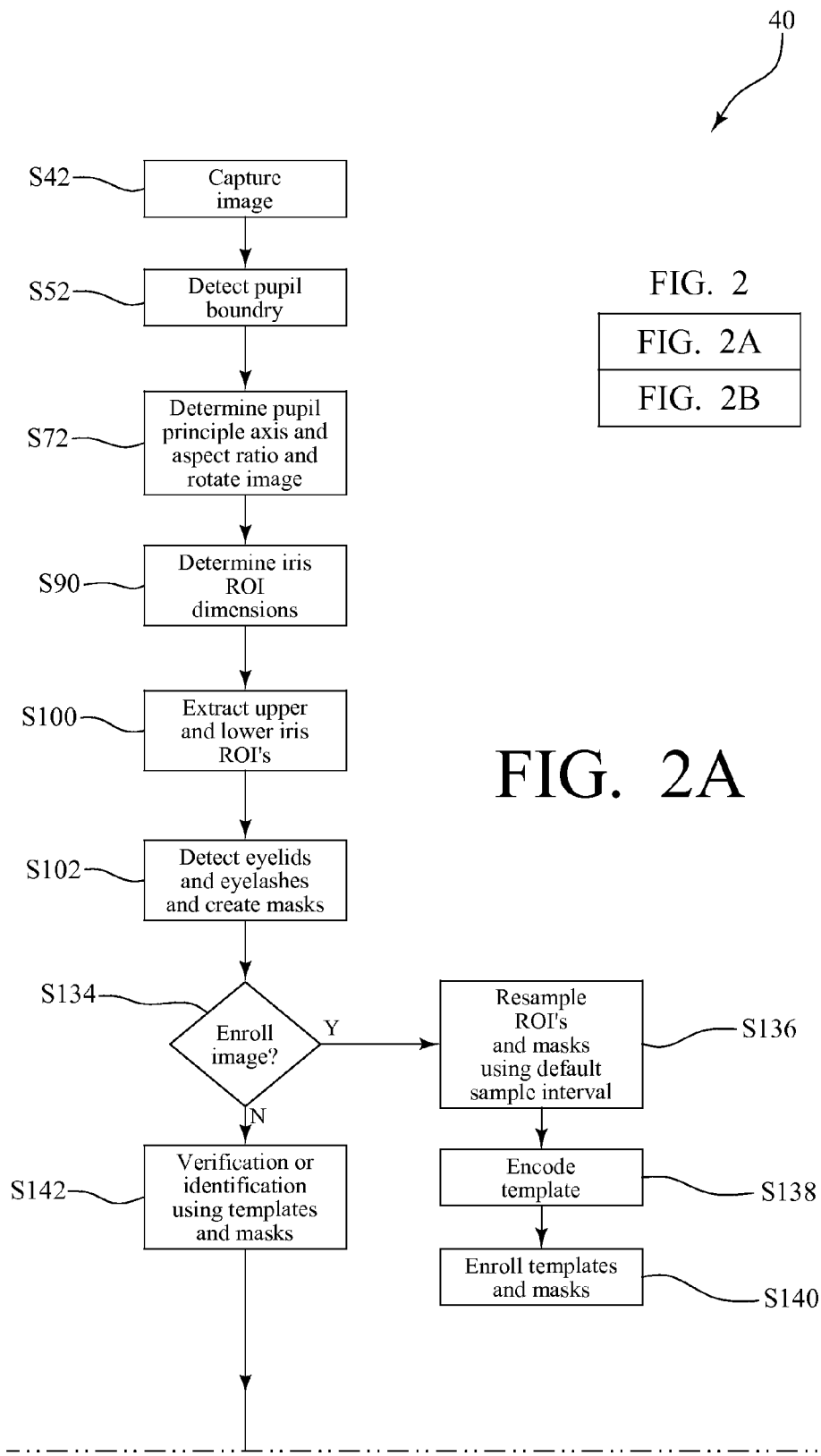

SYSTEM AND METHOD FOR ANIMAL IDENTIFICATION USING IRIS IMAGES

CROSS-REFERENCE TO RELATED APPLICATIONS

This application claims the benefit of U.S. Provisional Patent Application No. 61/028,623, filed Feb. 14, 2008, the entire disclosure of which is hereby incorporated by reference

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to animal identification using iris images.

2. Background Art

In recent years animal identification has become a topic of intense worldwide interest in the aftermath of terrorist incidents, outbreaks of bovine spongiform encephalitis (BSE) and, more recently, reports of e. coli contamination in beef. Both food and performance animals are routinely assigned identifiers in the form of markings, ear tags, RFID chips, RFID boluses, etc. in order to prevent fraud and facilitate various business processes. The availability of reliable identification technology and a national animal registration program such as the USDA's National Animal Identification System (NAIS) will enable rapid traceability of animals and control of outbreaks of disease and contamination in the food supply.

Improved animal identification techniques are needed for a number of different animal species. In performance animals, such as horses, reliable identification is needed to prevent fraud in competitive events and sales transactions. In food animals such as cattle, swine, and sheep a national identification system has been developed by the US Department of Agriculture to facilitate traceability of diseased animals. In companion animals, such as cats and dogs, there is a need to identify lost and stray animals so they may reunited with their owners or, if an owner cannot be found, placed for adoption. Existing animal identification techniques such as ear tags, implantable radio frequency identification (RFID) devices, or ingestible RFID devices, are undesirable because they are expensive, invasive, and potentially harmful to the animal. In the case of performance animals such as horses, existing identification techniques such as sketches of unique markings and lip tattoos have limited accuracy and reliability. In the case of food animals such as cattle, ear tags can fall off and become lost and ingestible or implantable devices may not be successfully recovered and may end up in food products. Hence a more accurate, noninvasive means of animal identification is needed.

U.S. Pat. No. 4,641,349 discloses the use of the iris to derive unique identifiers for humans and animals, but does not describe specific techniques for dealing with the unique characteristics of animal irises. Similarly, U.S. Pat. No. 5,291,560 discloses a set of algorithms for segmentation of human iris images, generation of iris templates, and matching of templates to accomplish human recognition. But these techniques are not suitable for animals because most animals do not have circular pupils, the pupils do not have consistent shape, the pupils may not have regular boundaries, the limbus or outer boundary of the iris is in most cases not visible, and the iris texture patterns do not change consistently within the image as the pupil contracts or dilates. U.S. Pat. No. 6,424,727 discloses a system for animal identification based on circular iris features, but does not describe a method of iris recognition that is suitable for animals having non-circular iris features. U.S. Pat. Nos. 6,229,905 and 6,320,973 describe an animal identification method based on the shape of iridial granules that are present in the eyes of most horses and cattle that are at least 2 years old. But such granules are not present in most other animals thus the techniques described are not generally usable for species other than horses and cattle. U.S. Pat. No. 6,614,919 discloses iris recognition algorithms for horse eyes that use a precise pupil outline and approximation of the outer iris boundary to extract a portion of the iris area below the pupil, encode the iris texture using Gabor wavelets, form a digital code based on phase changes in the output of the wavelet encoding process, and match presented and reference codes using a distance metric. But this reference does not disclose any method for eliminating regions of the iris that are obscured by eyelids, incorporating the upper iris region or the unique features of the granula iridica, if present, in the digital iris code, or applying a variable-scale matching technique to accommodate the effects of changes in pupil size.

BRIEF SUMMARY OF THE INVENTION

According to one aspect of the invention, a method for animal identification includes: obtaining an image of an eye of an animal including a pupil region and an iris region; extracting a set of pixel data from the image, the set of pixel data representing an upper region of interest of the iris region above the pupil region and a lower region of interest of the iris region below the pupil region, the upper region of interest and the lower region of interest having parallel side boundaries that are spaced apart a distance that is substantially independent of a degree of dilation of the pupil region; and transforming the set of pixel data representing the upper region of interest and the lower region of interest into a template of the upper region of interest and the lower region of interest, the template for use in identifying the animal.

In accordance with one implementation, extracting a set of pixel data from the image includes: determining a pupil aspect ratio of a minor axis of the pupil region to a major axis of the pupil region; determining a major axis length at a condition of minimum pupil dilation (MALmin) using the pupil aspect ratio; and determining a location of the parallel side boundaries of the upper region of interest and the lower region of interest using the MALmin.

Further, the image of the eye may include a pupil having an irregular boundary, and determining the pupil aspect ratio may further include: determining the irregular boundary of the pupil; constructing a convex hull of the irregular boundary of the pupil; and using the convex hull of the irregular boundary of the pupil as a boundary of the pupil region in all subsequent operations.

Determining the irregular boundary of the pupil may include: detecting a specular reflection region in an interior of the pupil by identifying pixels within a central sub-image of the image of the eye having an intensity greater than a specular reflection threshold value; constructing a histogram of pixel intensity values in an area immediately surrounding the specular reflection region; determining a pupil threshold value using the histogram of pixel intensity values in the area immediately surrounding the specular reflection region; and differentiating between the pupil and surrounding areas of the pupil using the pupil threshold value to determine the irregular boundary of the pupil.

Then, successive image morphological closing operations may be performed on an area within the irregular boundary of the pupil until an Euler number representation of the pupil region is equal to one to eliminate internal holes in the pupil region.

Further still, determining the pupil aspect ratio of the minor axis of the pupil region to the major axis of the pupil region may include performing principle component analysis on points lying within the convex hull of the irregular boundary of the pupil to identify the major axis of the pupil region and the minor axis of the pupil region.

The implementation of the method may further include rotating the image of the eye of the animal so that the major axis becomes horizontal.

Even further still, $MAL_{min}$ may be calculated as $MAL_{min}=MAL*(1+P_1+P_2*PAR^2+P_3*PAR^3)$, wherein MAL is a measured major axis length, PAR is a measured pupil aspect ratio, and parameters $P_1$, $P_2$, and $P_3$ are predetermined by fitting a curve to empirical values of MAL and PAR for several animal eyes imaged at various degrees of dilation. An "ROI width" is a width of the upper region of interest and the lower region of interest calculated as: ROI width=$C_1*MAL_{min}$, wherein $C_1$ is predetermined by empirical analysis of the several animal eyes imaged at various degrees of dilation. An "ROI height" is a height of the upper region of interest and the lower region of interest calculated as: ROI height=$C_2*MAL_{min}$–Minor Axis Length/2, wherein $C_2$ is predetermined by empirical analysis of the several animal eyes imaged at various degrees of dilation. Then, the upper region of interest and the lower region of interest may extend from the convex hull of the irregular boundary of the pupil outwardly a distance equal to the ROI height and have a width extending a distance equal to the ROI width positioned as a function of a position of the major axis of the pupil region, MAL, and PAR.

In accordance with another implementation, transforming the set of pixel data includes: processing the set of pixel data from the image using log-Gabor wavelets in a complex transformation to produce phase information for each pixel of the set of pixel data; and encoding the phase information for each pixel of the set of pixel data as a two bit value for each pixel to produce a template that provides a compact representation of iris texture features.

In accordance with yet another implementation, the method further includes: locating an upper eyelid in the upper region of interest and a lower eyelid in the lower region of interest; and encoding a mask image of the upper region of interest and the lower region of interest, the mask image for use in masking the upper eyelid and the lower eyelid from the upper region of interest and the lower region of interest.

The implementation of the method may further include: locating eyelashes in the upper region of interest; creating an eyelash mask image of the eyelashes in the upper region of interest; and combining the eyelash mask image with the mask image of the upper region of interest to produce a combined mask image for use in masking the eyelashes from the upper region of interest.

Then, the implementation of the method may further include generating a plurality of comparison templates and a corresponding plurality of comparison mask images by: applying a plurality of scale factors applied to the upper region of interest and the lower region of interest to generate a plurality of re-sampled upper regions of interest and lower regions of interest; and generating a comparison template and a comparison mask image from each of the plurality of re-sampled upper regions of interest and lower regions of interest. Then, the embodiment of the method includes: determining a match score value for each comparison template by comparing each comparison template and each comparison mask image to a previously enrolled template and a previously enrolled mask image of an eye of a previously identified animal; and determining whether the eye of the animal matches the eye of the previously identified animal by comparing each match score value to a match threshold value.

Alternately, the implementation of the method further includes: generating a plurality of comparison templates and a corresponding plurality of comparison mask images by re-sampling the template and to the mask image using a plurality of scale factors; determining a match score value for each of the plurality of comparison templates by comparing each of the plurality of comparison templates and the corresponding plurality of comparison mask images to a previously enrolled template and a previously enrolled mask image of an eye of a previously identified animal; and determining whether the eye of the animal matches the eye of the previously identified animal by comparing each match score values to a match threshold value.

According to another aspect of the invention, a system for animal identification includes: an image capture apparatus for obtaining an image of an eye of an animal including a pupil region and an iris region; and a template generation apparatus. The template generation apparatus is for: extracting a set of pixel data from the image, the set of pixel data representing an upper region of interest of the iris region above the pupil region and a lower region of interest of the iris region below the pupil region, the upper region of interest and the lower region of interest having parallel side boundaries that are spaced apart a distance that is substantially independent of a degree of dilation of the pupil region; and transforming the set of pixel data representing the upper region of interest and the lower region of interest into a template of the upper region of interest and the lower region of interest, the template for use in identifying the animal.

In accordance with one implementation, extracting the set of pixel data from the image by the template generation apparatus includes: determining a pupil aspect ratio of a minor axis of the pupil region to a major axis of the pupil region; determining a major axis length at a condition of minimum pupil dilation ($MAL_{min}$) using the pupil aspect ratio; and determining a location of the parallel side boundaries of the upper region of interest and the lower region of interest using the $MAL_{min}$.

The image of the eye may include a pupil having an irregular boundary, and determining the pupil aspect ratio by the template generation apparatus may further includes: determining the irregular boundary of the pupil; constructing a convex hull of the irregular boundary of the pupil; and using the convex hull of the irregular boundary of the pupil as a boundary of the pupil region in all subsequent operations.

In accordance with another implementation, the template generation apparatus is further for: locating an upper eyelid in the upper region of interest and a lower eyelid in the lower region of interest; and encoding a mask image of the upper region of interest and the lower region of interest, the mask image for use in masking the upper eyelid and the lower eyelid from the upper region of interest and the lower region of interest.

The system may still further include an enrollment database in communication with the template generation apparatus for: receiving from the template generation apparatus the template of the upper region of interest and the lower region of interest, and the mask image of the upper region of interest and the lower region of interest; and storing the template of the upper region of interest and the lower region of interest, and the mask image of the upper region of interest and the lower region of interest along with information that includes an identifier for the animal.

In one implementation, the system further includes a variable-scale matching apparatus in communication with the template generation apparatus and the enrollment database for generating a plurality of comparison templates and a corresponding plurality of comparison mask images by: applying a plurality of scale factors applied to the upper region of interest and the lower region of interest to generate a plurality of re-sampled upper regions of interest and lower regions of interest; and generating a comparison template and a comparison mask image from each of the plurality of re-sampled upper regions of interest and lower regions of interest. Then, the variable-scale matching apparatus is for: determining a match score value for each comparison template by comparing each comparison template and each comparison mask image to a previously enrolled template and a previously enrolled mask image of an eye of a previously identified animal retrieved from the enrollment database; and determining whether the eye of the animal matches the eye of the previously identified animal by comparing each match score value to a match threshold value.

Alternately, the system further includes a variable-scale matching apparatus in communication with the template generation apparatus and the enrollment database for: generating a plurality of comparison templates and a corresponding plurality of comparison mask images by re-sampling the template and to the mask image using a plurality of scale factors; determining a match score value for each of the plurality of comparison templates by comparing each of the plurality of comparison templates and the corresponding plurality of comparison mask images to a previously enrolled template and a previously enrolled mask image of an eye of a previously identified animal retrieved from the enrollment database; and determining whether the eye of the animal matches the eye of the previously identified animal by comparing each match score values to a match threshold value.

In accordance with another implementation, the system further includes an infrared illumination source illuminating the eye of the animal with infrared light, and an image acquisition device in communication with the image capture apparatus. The image acquisition device includes: an optical lens, an infrared bandpass filter, and a high resolution digital camera in optical communication with the eye of the animal for acquiring an image of the eye of the animal; and a graphical display for providing a live video image to an operator to facilitate positioning of the image acquisition device relative to the eye of the animal.

Other features and advantages of the invention will be set forth in, or apparent from, the detailed description of exemplary embodiments of the invention found below.

BRIEF DESCRIPTION OF THE SEVERAL VIEWS OF THE DRAWINGS

These and other features, aspects, and advantages of the present invention will become better understood with regard to the following description, appended claims, and accompanying drawings where:

DETAILED DESCRIPTION OF EXEMPLARY EMBODIMENTS OF THE INVENTION

Figure 1:
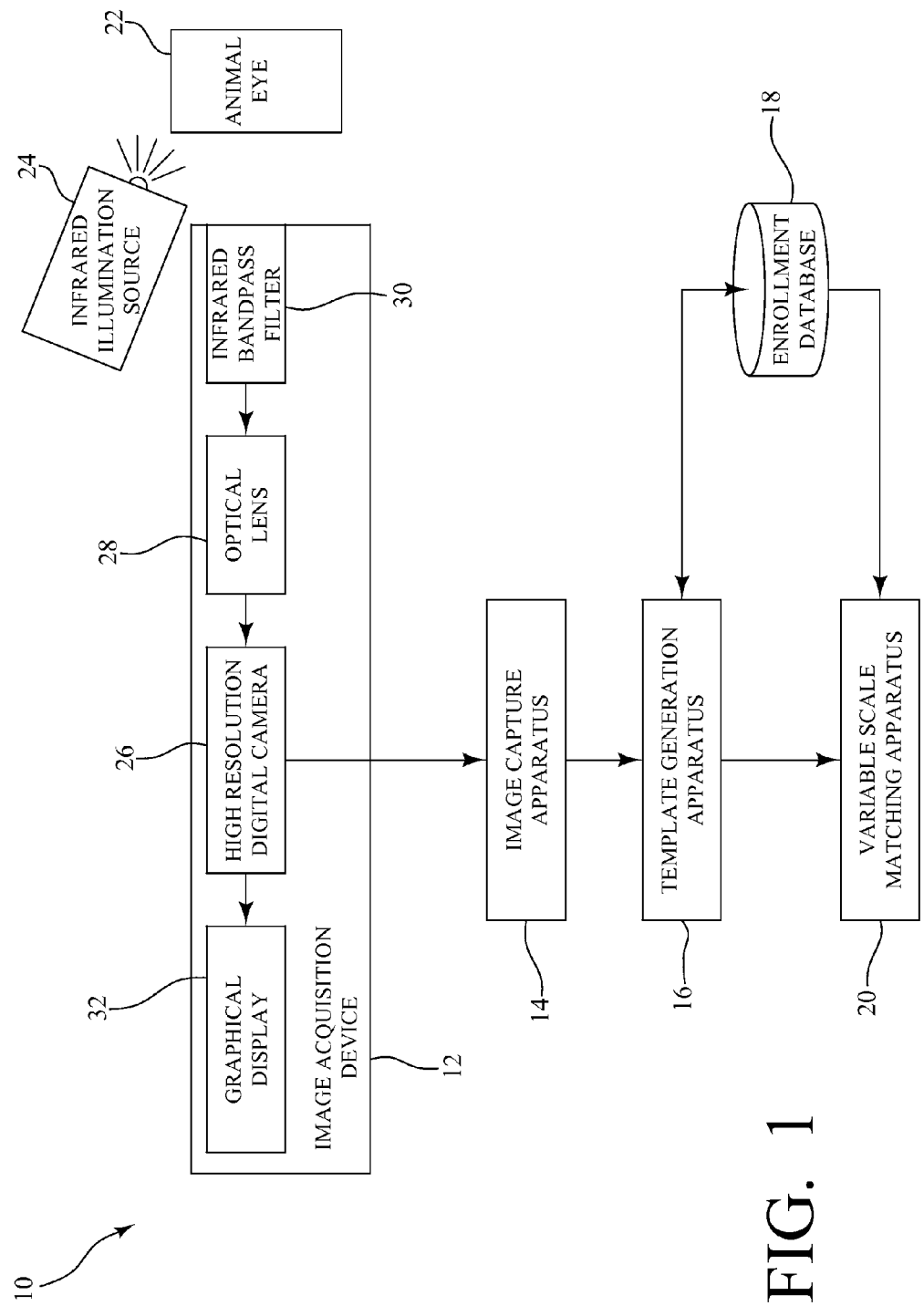
FIG. 1 is functional block diagram of an exemplary system for animal identification using iris images according to the invention.

FIG. 1 shows an exemplary system 10 for animal identification using iris images, including an image acquisition device 12, an image capture apparatus 14, a template generation apparatus 16, an enrollment database 18, and a variable-scale matching apparatus 20. An image of an animal eye 22 is captured using the image acquisition device 12. The animal eye 22 is preferably illuminated by an infrared illumination source 24. The infrared illumination source 24 may be integral with the image acquisition device 12, or may be independent.

The image acquisition device 12 consists of a high resolution digital camera 26, an optical lens 28, an infrared bandpass filter 30, and a graphical display 32. The high resolution digital camera 26 and the infrared bandpass filter 30 operate in conjunction with the infrared illumination source 24 in the near-infrared to infrared spectrum with light having wavelengths extending from about 720 to 850 nanometers. The graphic display 32 is used to provide a live video image to an operator to facilitate positioning of the image acquisition device 12 relative to the animal eye 22 to obtain proper alignment and focus of the image. The high resolution digital camera 26 and the optical lens 28 preferably include automatic focusing features to assure good image quality.

The exemplary system 10 has two fundamental operating modes, the first being enrollment and the second being recognition. In either operating mode, the image capture apparatus 14 and template generation apparatus 16 function in a substantially similar manner. Advantageously, the image capture apparatus 14, the template generation apparatus 16, and the variable-scale matching apparatus 20 may be implemented as separate machines or as an integral machine using standard programming and/or engineering techniques to produce software, firmware, hardware, or any combination thereof. Preferably, the image capture apparatus 14, the template generation apparatus 16, and the variable-scale matching apparatus 20 are general purpose computers cooperating with each other using hardware interfaces and software to implement the functions and method steps described below.

Figure 2B:
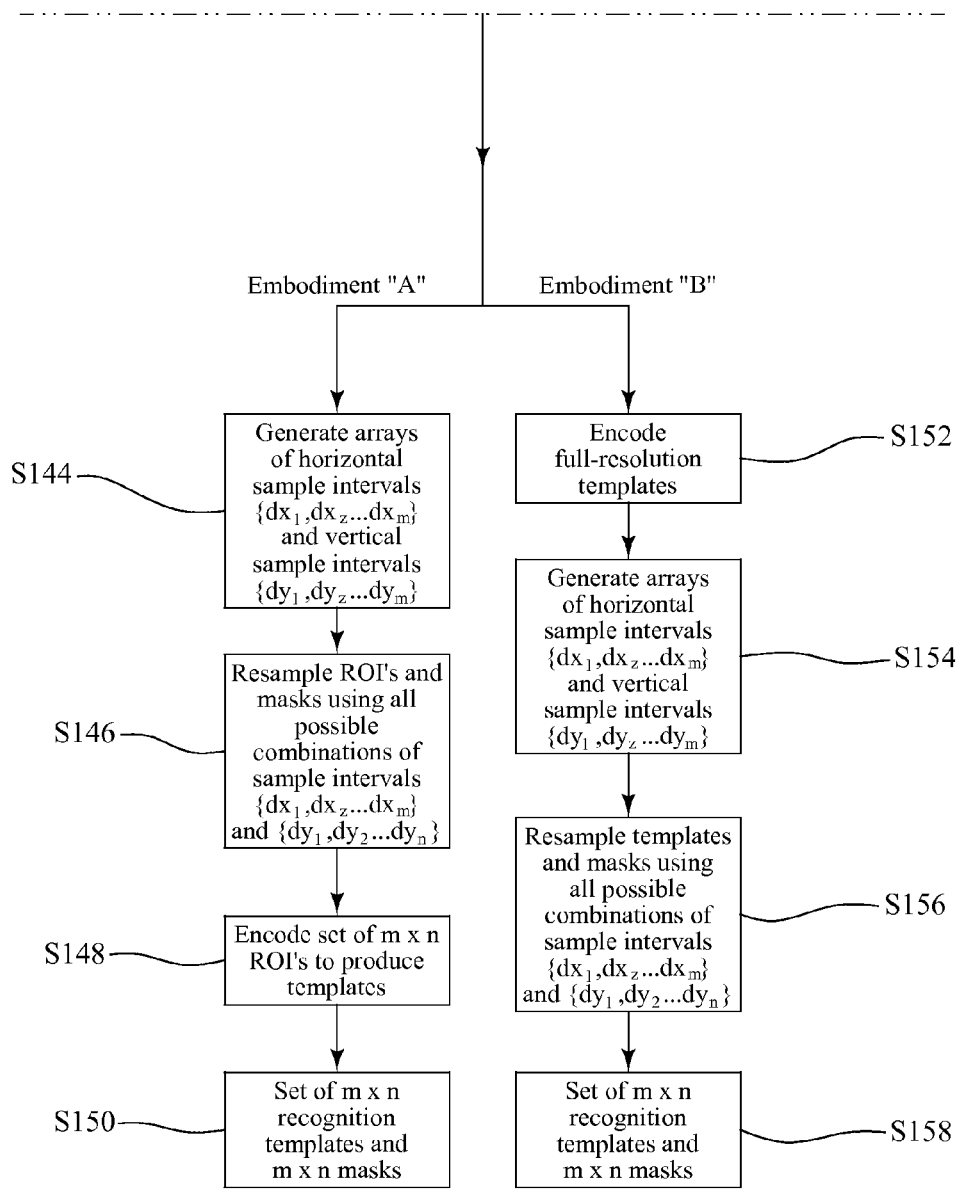
FIG. 2 is composite flow chart comprising FIG. 2A and FIG. 2B of an exemplary method for animal identification using iris images according to the invention.

FIG. 2 shows the steps of an exemplary method 40 for animal identification using iris images, as might be performed by the exemplary system 10 of FIG. 1.

A first step is S42 capturing or obtaining an image of an animal eye, such as the animal eye 22 of FIG. 1, by an image capture apparatus, such as the image capture apparatus 14 of FIG. 1. Video images from an image acquisition device, such as the image acquisition device 12 of FIG. 1, are analyzed by the image capture apparatus as they are acquired, and suitably focused and aligned images are automatically captured and stored in digital form for further processing.

Figure 4:
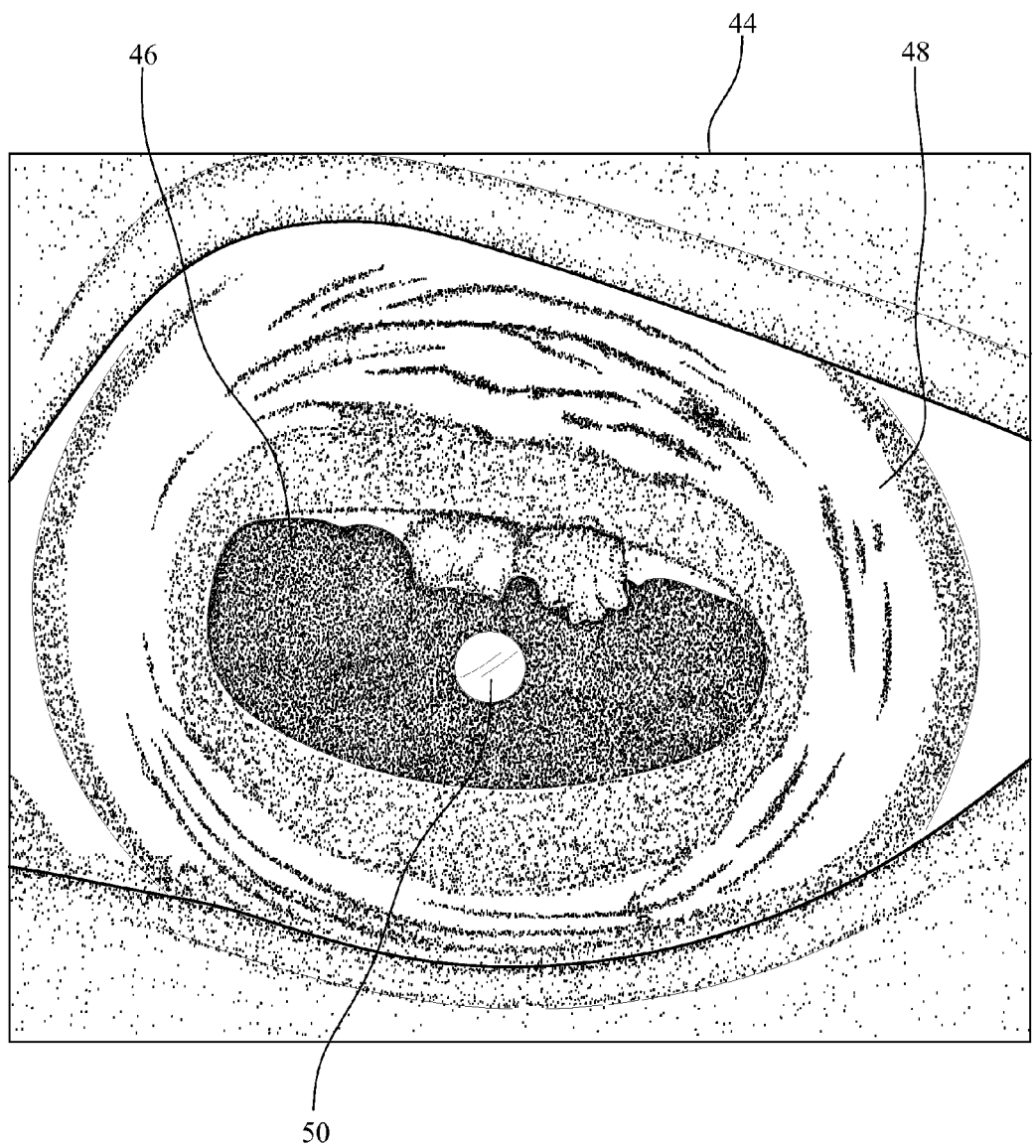
FIG. 4 is a schematic diagram of an exemplary image of an animal eye.

FIG. 4 shows an exemplary image 44 of the animal eye including a pupil 46, and an iris region 48 surrounding the pupil 46, which will be described in more detail below. The step S42 (FIG. 2) of capturing or obtaining the image of the animal eye includes automatically centering the image 44 so that a specular reflection 50 (or a specular reflection region) of an illumination source, such as the infrared illumination source 24 of FIG. 1, from a front surface of a cornea of the animal eye, which appears as a bright spot, is near the center of the image 44.

A template generation apparatus, such as the template generation apparatus 16 of FIG. 1, performs, as discussed in more detail below, several image segmentation steps followed by encoding of portions of the iris region 48 to generate a binary template. Advantageously, for consistency, the portions of the iris region 48 that are encoded are substantially independent of a degree of dilation of the pupil 46.

It is noted that the several image segmentation steps discussed below are described as applied to an equine (horse) eye image. However, one of skill in the art will immediately recognize that substantially similar steps would apply to identification using iris images of other species without departing from the spirit or the scope of the invention as described and claimed herein.

Returning to FIG. 2, a first of the image segmentation steps is step S52 detecting or determining a boundary of the pupil.

Figure 3:
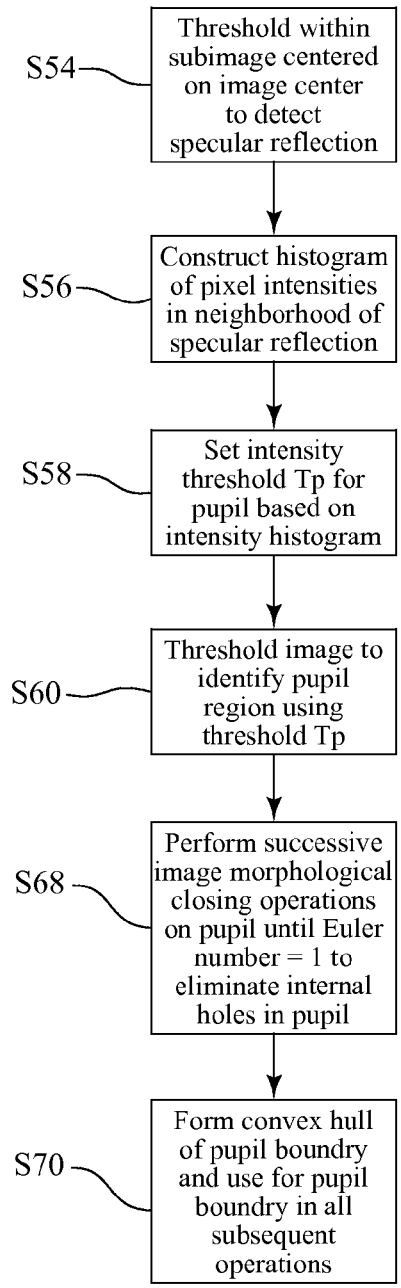
FIG. 3 is a flow chart of an exemplary process for detecting a boundary of a pupil in an image of an animal eye.

FIG. 3 is a flow chart of an exemplary method or process for performing step S52 (FIG. 2) detecting or determining a boundary of the pupil, and will be described with reference to FIG. 4 through FIG. 6.

Step S54 is detecting the specular reflection 50 in the image 44 by comparing the pixels within a central sub-image to a threshold slightly less than an expected intensity of the pixels within the specular reflection 50, and then setting reflection pixels to the value "1" and other pixels to the value "0." The expected intensity of the pixels with in the specular reflection 50 is a predetermined "specular reflection threshold value." Advantageously, the central sub-image is assumed to contain the specular reflection 50 and the specular reflection 50 is assumed to be within the pupil 46 of the image 44 because, as discussed above, the image capture apparatus has automatically centered the image 44 so that the specular reflection 50 is near the center of the image 44. In the resulting binary sub-image, row and column sums of the sub-image are formed and the row and column containing the maximum number of nonzero pixels are located to provide an estimate of the location of the center of the reflection.

Step S56 is constructing a histogram of pixel intensity values in the original image in the area immediately surrounding the specular reflection 50.

Step S58 is determining a pupil threshold value using the histogram of pixel intensity values in the area immediately surrounding the specular reflection 50.

Step S60 is differentiating between the pupil 46 and surrounding areas of the 46 pupil using the pupil threshold value to determine a pupil boundary, and modifying the image 44 so that the area within the pupil boundary is in a binary format in which pixels less than the pupil threshold value have the value "1" and other pixels have the value "0".

Figure 5:
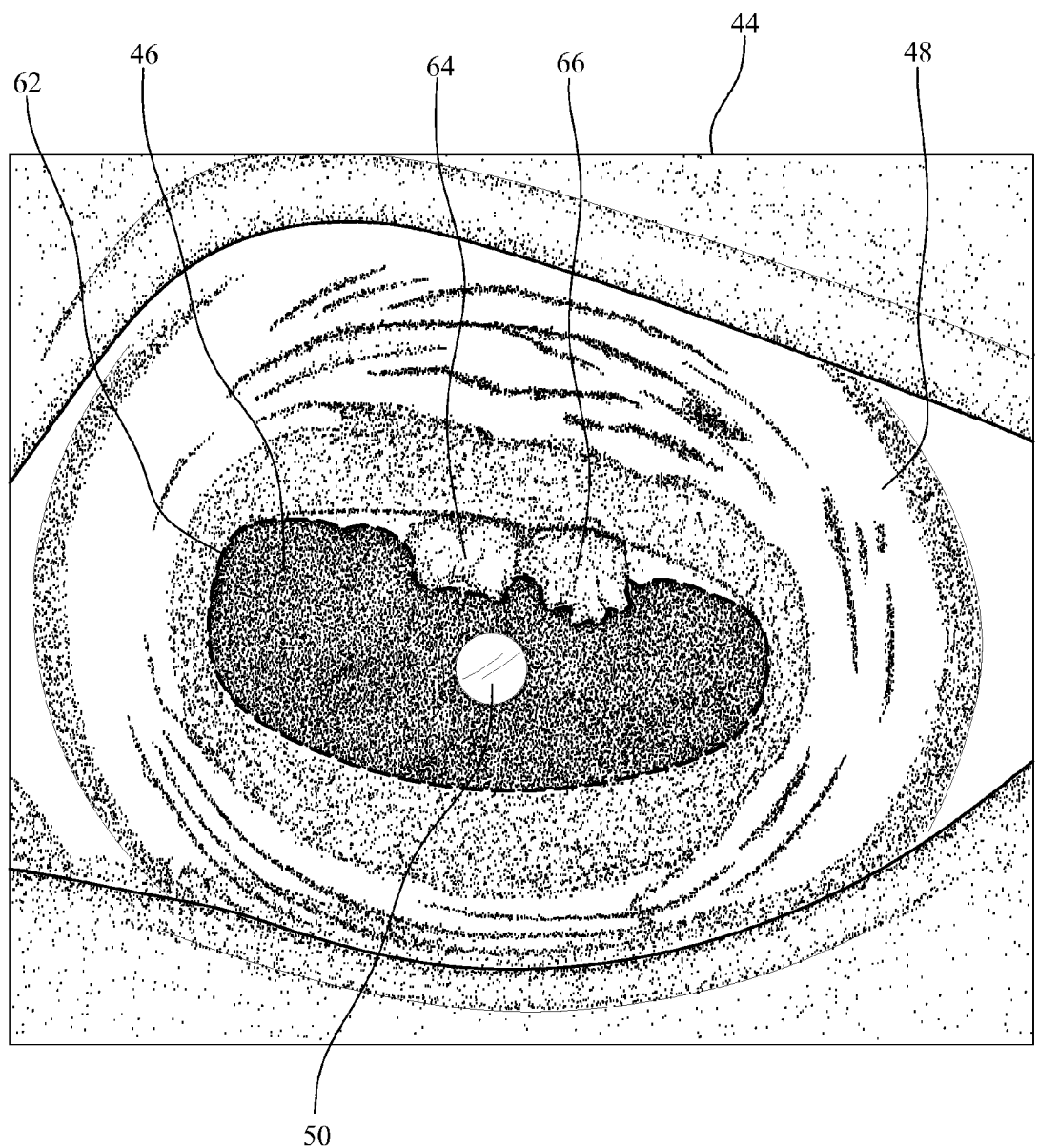
FIG. 5 is a schematic diagram of the image of the animal eye of FIG. 4 showing a pupil boundary.

FIG. 5 shows a pupil boundary 62 determined using the pupil threshold value to differentiate between a darker area of the pupil 46 and a lighter surrounding area of the iris 48 and granula iridica 64, 66, the irregular nodules along an upper margin of the pupil 46. The granula iridica 64, 66, in particular, cause the determined pupil boundary 62 to be irregular in shape.

Returning to FIG. 3, there will typically be groups of "0" pixels within the pupil boundary due to the presence of the specular reflections 50 and other reflections. Step S68 is removing these "holes" by applying a series of morphological closing operations on the area within the pupil boundary until an Euler number representation of the area within the pupil boundary is equal to one, indicating that all extraneous holes in the area within the pupil boundary have been eliminated. The result is a uniform region of connected pixels with the value "1".

Step S70 is constructing a convex hull of the area within the pupil boundary, and using the convex hull as the boundary of a pupil region in all subsequent operations. Construction the convex hull produces a smooth boundary of the pupil region without any irregularities, and, in particular, removes those irregularities produced by the granula iridica. In mathematics, the convex hull or convex envelope for a set of points in a real vector space is the minimal convex set containing the set of points. For planar objects, such as the area within the pupil boundary of the image of the animal eye, the complex hull may be visualized by imagining an elastic band stretched open to encompass the area and releases to assume the shape of the required convex hull. It is noted that this step is not necessary in species having smooth, regular pupil boundaries.

Figure 6:
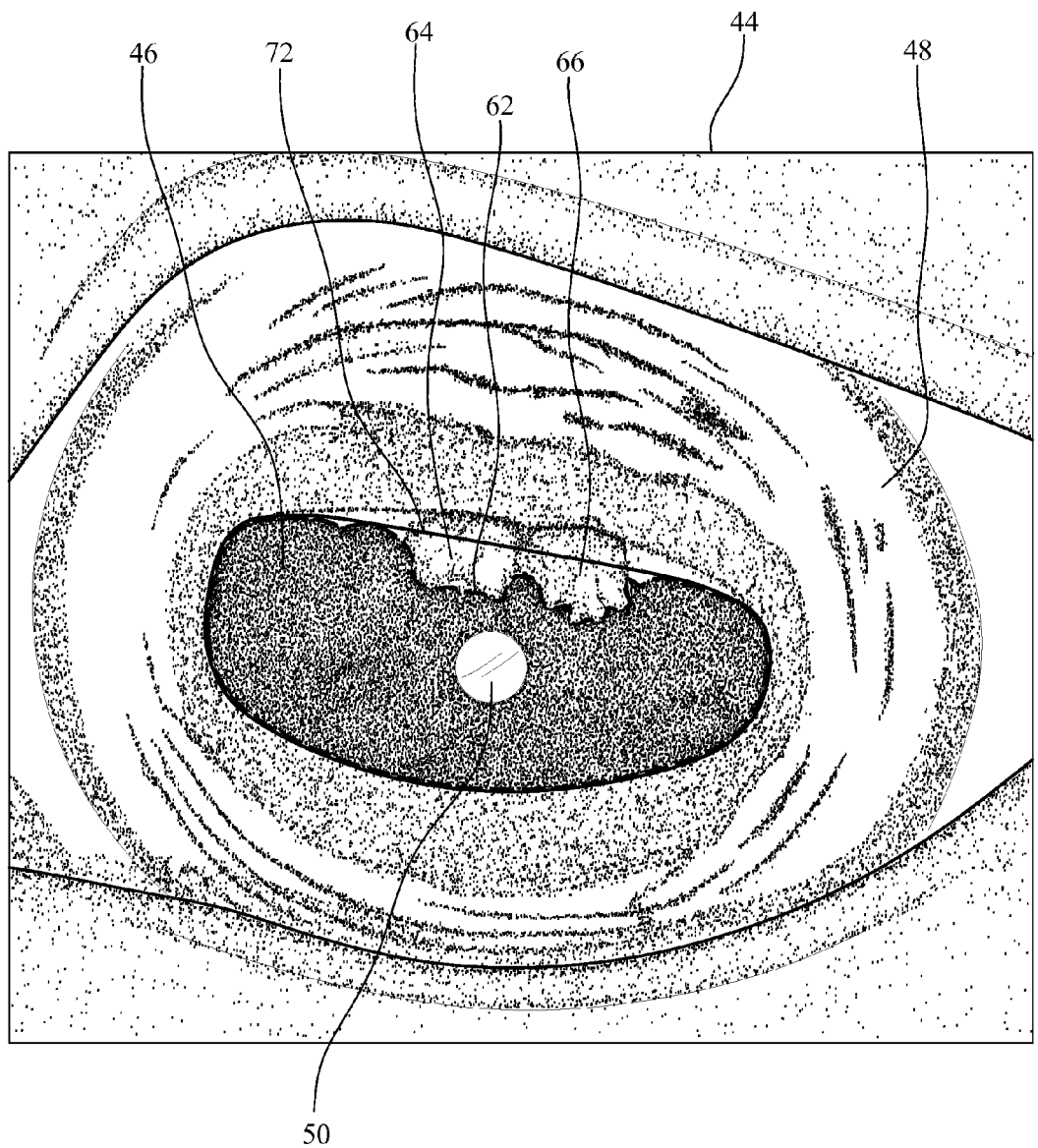
FIG. 6 is a schematic diagram of the image of the animal eye of FIG. 4 showing a convex hull of the pupil boundary.

FIG. 6 shows a convex hull 72 of the pupil boundary 62, producing a smooth boundary of the pupil 46 for use as the boundary of the "pupil region" in subsequent operations. The convex hull removes the irregularities produced by the granula iridica 64, 66.

Returning to FIG. 2, a next of the image segmentation steps is step S72 determining principal axes of the pupil region, an aspect ratio thereof, and rotating the image.

Figure 7:
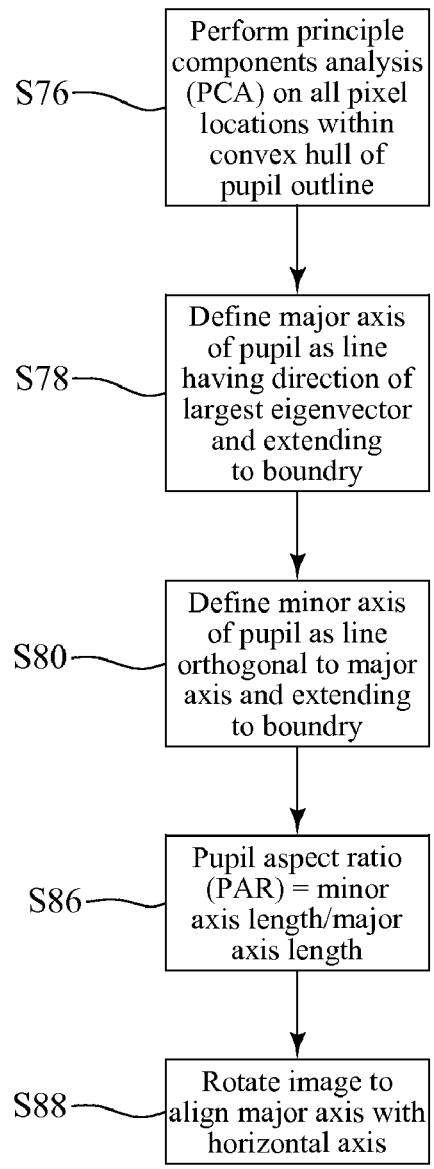
FIG. 7 is a flow chart of an exemplary method for determining principal axes of the pupil region, an aspect ratio thereof, and rotating the image.

FIG. 7 is a flow chart of an exemplary method or process for performing step S72 (FIG. 2) determining principal axes of the pupil region, an aspect ratio thereof, and rotating the image, and will be described with reference to FIG. 8 and FIG. 9.

Step S76 is performing principal component analysis (PCA) on points lying within the boundary of the pupil region (i.e., within the convex hull) to identify the major axis of the pupil region and the minor axis of the pupil region. See: Gonzales, R., Woods, R., and Eddins, S., Digital Image Processing Using MATLAB®, Pearson Prentice Hall, Upper Saddle River N.J., 2004, p. 474-476, which is incorporated herein by reference.

Step S78 is defining a major axis of the pupil region as a line having a direction of a largest eigenvector and extending in both directions to the boundary of the pupil region.

Step S80 is defining a minor axis of the pupil region as a line orthogonal to the major axis and extending in both directions to the boundary of the pupil region. The minor axis is positioned at the midpoint of that portion of the major axis that lies within the pupil.

Figure 8:
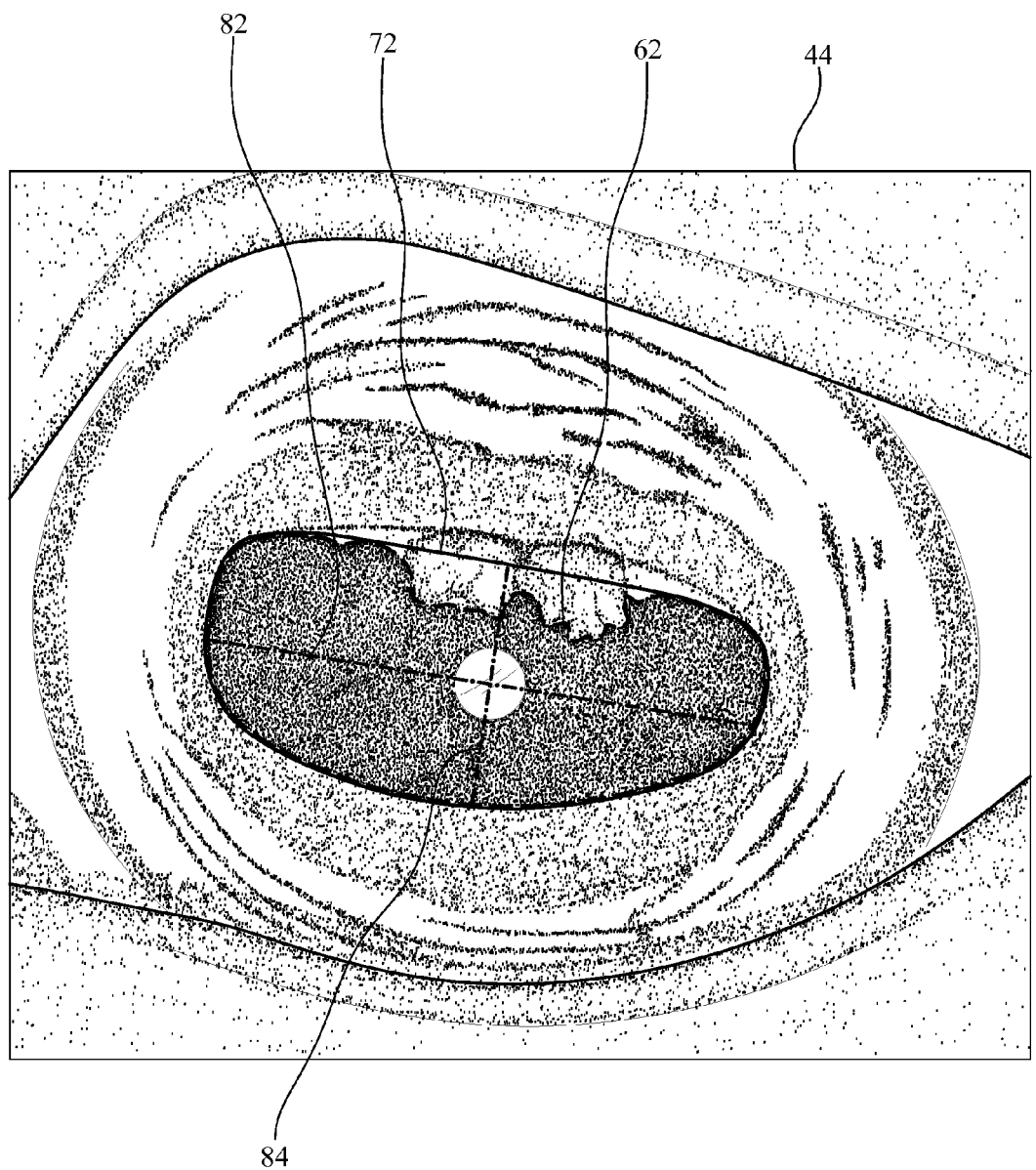
FIG. 8 is a schematic diagram of the image of the animal eye of FIG. 4 showing a major axis and a minor axis of the convex hull of the pupil boundary.

FIG. 8 shows a major axis 82 and a minor axis 84 of the convex hull 72 of the pupil boundary 62.

Returning to FIG. 7, step S86 is determining a pupil aspect ratio of a length of the minor axis of the pupil region to a length of the major axis of the pupil region. It is noted that the pupil aspect ratio is a dimensionless value. Further, it is noted that in species having approximately circular pupils, the determination of the major axis and minor axis is not necessary.

Step S88 is rotating the image of the eye of the animal so that the major axis becomes horizontal.

Figure 9:
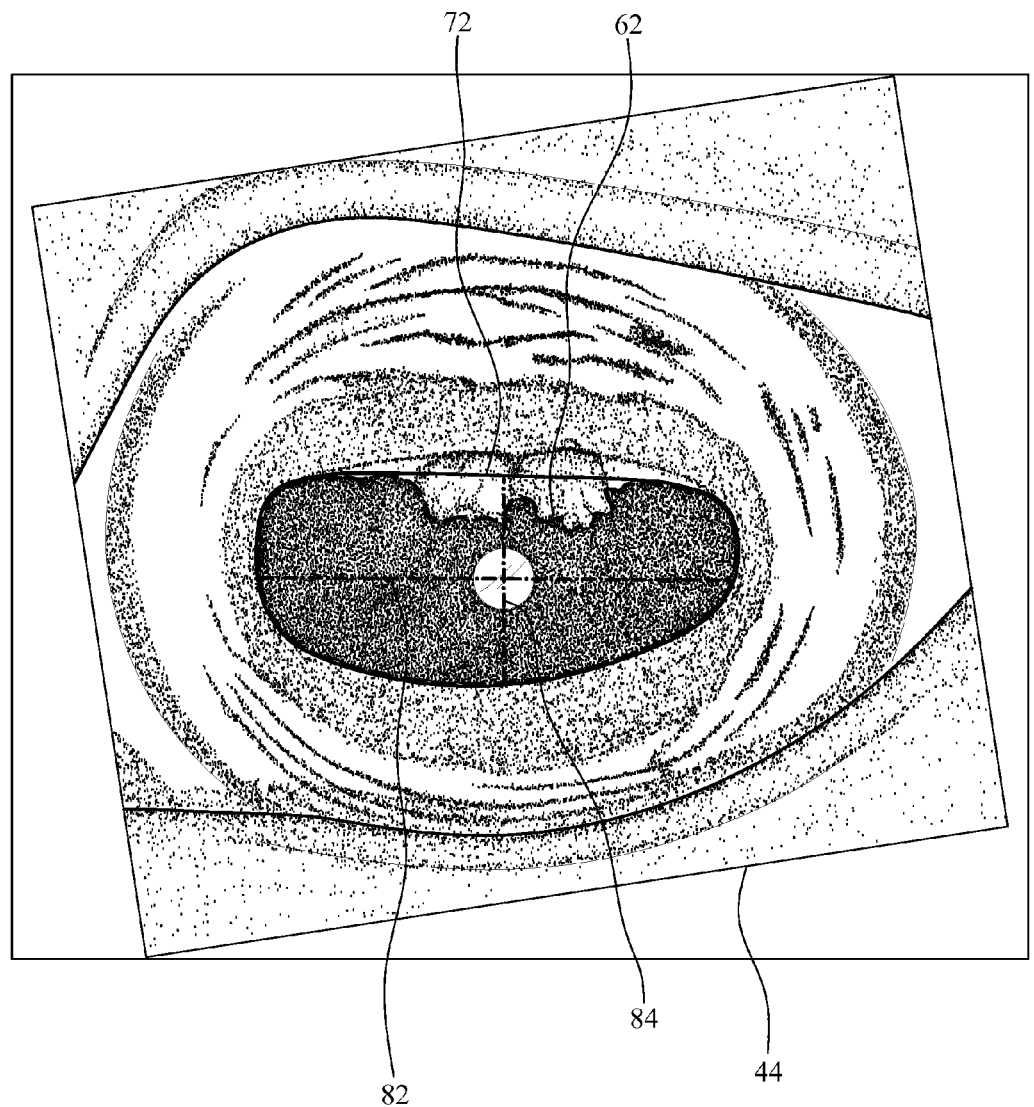
FIG. 9 is a schematic diagram of the image of the animal eye of FIG. 4 showing rotation of the image of the animal eye rotated so that the major axis becomes horizontal.

FIG. 9 shows rotation of the image 44 of the animal eye rotated so that the major axis 82 becomes horizontal.

Returning again to FIG. 2, another of the image segmentation steps is step S90 determining dimensions of an upper region of interest (ROI) of the iris region above the pupil region, and a lower region of interest of the iris region below the pupil region. The use of these regions is desirable because the effects of pupil dilation are most consistent and predictable in these regions. The boundary of each ROI adjacent to the pupil is formed by the upper or lower edge of the convex hull. The side boundaries are vertical with their horizontal position a function of the position and length of the major axis of the pupil and the aspect ratio of the pupil.

Figure 10:
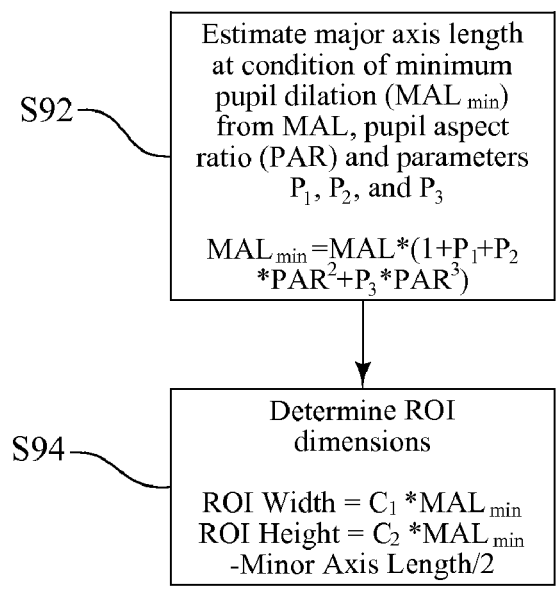
FIG. 10 is a flow chart of exemplary method or process for determining dimensions of an upper region of interest of the iris region above the pupil region, and a lower region of interest of the iris region below the pupil region.

FIG. 10 is a flow chart of an exemplary method or process for performing step S90 (FIG. 1) determining dimensions of an upper region of interest of the iris region above the pupil region, and a lower region of interest of the iris region below the pupil region, and will be described with respect to FIG. 11. The process for determining dimensions of an upper region of interest and a lower region of interest is intended to correct for variations in pupil dilation. In order to be able to compare multiple images from the same eye, it is necessary to correct for both scale changes between the images and for changes in iris dimensions due to pupil dilation and contraction. In human eyes the outer boundary of the iris, which is fixed in size and easily detected, provides a consistent feature that can be used for scale adjustments. As discussed above, in the equine eye, and those of most other species, the outer iris boundary has an irregular shape and cannot be determined reliably. The pupil dimensions are not constant, and its shape changes as it dilates and contracts, so its usefulness for scale normalization is limited. However, the aspect ratio of the pupil region provides an indication of the degree of pupil dilation because the pupil height changes much more dramatically than the width with dilation. Empirical analyses of the relationship between the major axis length and the aspect ratio of the pupil region provides information to estimate, for a given image, what the major axis length of the pupil region would be at a state of minimum dilation ($MAL_{min}$). $MAL_{min}$ is then used as a "yardstick" for compensating for scale changes. In particular, the width and height of the iris regions above and below the pupil, which are used for template generation, are determined as fixed fractions of the estimated "zero-dilation" pupil length, $MAL_{min}$.

Step S92 is estimating $MAL_{min}$ as:

$$MAL_{min} = MAL*(1 + P_1 + P_2*PAR^2 + P_3*PAR^3) \qquad (1)$$

wherein MAL is the measured major axis length, PAR is the measured pupil aspect ratio, and parameters $P_1$, $P_2$, and $P_3$ are predetermined by fitting a curve to empirical values of MAL and PAR for several animal eyes imaged at various degrees of dilation. The estimation of $P_1$, $P_2$, and $P_3$ requires multiple sets of samples where each set exhibits varying degrees of dilation for the same eye, and multiple sets are acquired for species of various ages and breeds. It might be necessary to use different estimates for different ages and breeds if there is enough variation in $P_1$, $P_2$, and $P_3$. Since there are three unknown coefficients, each set of samples (exhibiting various degrees of dilation of the same eye) must contain at least three samples to uniquely define the coefficients. It is recommended that at least five to six samples be obtained from each eye over the widest possible range of dilation. The number of eyes should be as large as possible and encompass all age ranges and breeds. For instance, with respect to horses, ideally a single breed would be selected and samples from ten eyes each from horses of ages 2, 5, 10, and 15 years would be obtained. Then, it could be examined whether there was significant change in the estimated parameters as a function of age. For each age, the values of $P_1$, $P_2$, and $P_3$ are estimated as the average of the ten samples obtained. Likewise, samples on 10 eyes from each available horse breed are obtained, selecting horses of about the same age in all cases (say 2-4 years). In this manner, a determination could be made whether there was a significant difference in the parameters between breeds. Since the independent variable PAR is a ratio of distances it is dimensionless and the data from all of these eyes can be pooled without concern about image scale.

Step S94 is determining ROI dimensions. A ROI width is a width of the upper region of interest and the lower region of interest calculated as:

$$ROI\ width = C_1*MAL_{min} \qquad (2)$$

wherein $C_1$ is predetermined by empirical analysis of the several animal eyes imaged at various degrees of dilation. A ROI height is a height of the upper region of interest and the lower region of interest calculated as:

$$ROI\ height = C_2*MAL_{min} - Minor\ Axis\ Length/2 \qquad (3)$$

wherein $C_2$ is predetermined by empirical analysis of the several animal eyes imaged at various degrees of dilation. $C_1$ and $C_2$ define the width and height of the iris ROIs as a function of $MAL_{min}$. They are to some extent arbitrary, except that $C_1$ must be less than 1.0 to make sure the upper and lower ROIs will not extend past the pupil edges on the left and right. An exemplary value of $C_1$ is 0.95. $C_2$ should be chosen to make sure that the ROI extends roughly from the lower pupil margin to the lower eyelid. An exemplary value of $C_2$ is 0.9.

Figure 11:
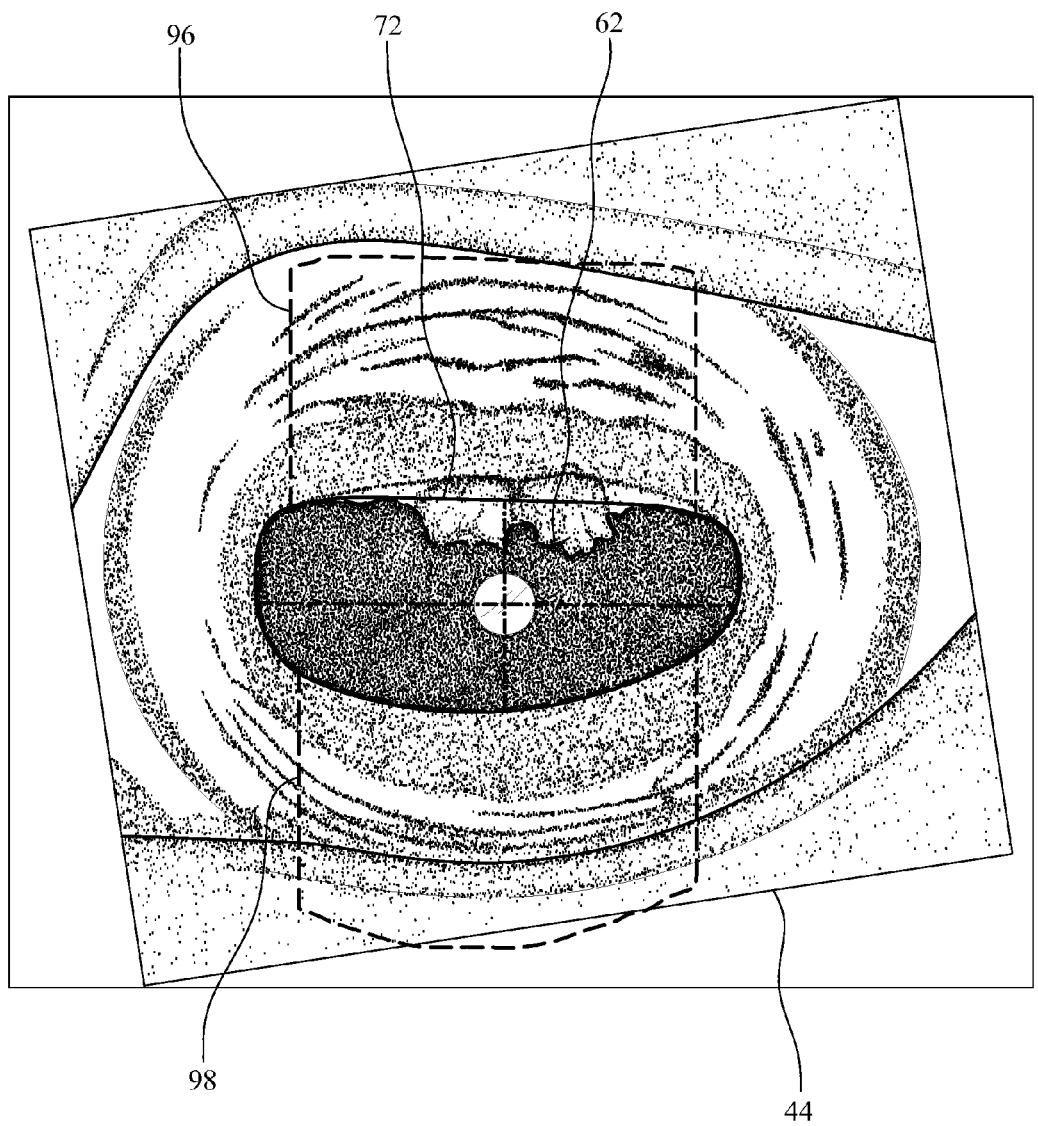
FIG. 11 is a schematic diagram of the image of the animal eye of FIG. 4 showing an upper region of interest and a lower region of interest.

FIG. 11 shows an upper region of interest 96 and a lower region of interest 98 extending from the convex hull 72 of the pupil boundary 62 outwardly a distance equal to the ROI height. The upper region of interest 96 and the lower region of interest 98 have a width extending a distance equal to the ROI width, centered on the midpoint of the pupil major axis and extending to the left and right with width as described above as a function of the major axis of the pupil, MAL, and PAR.

Returning again to FIG. 2, the next of the image segmentation steps is step S100 extracting a set of pixel data from the image representing the upper region of interest and the lower region of interest.

The next step is step S102 detecting eyelids and eyelashes and creating a mask image so that such areas will not be used for matching purposes.

Figure 12:
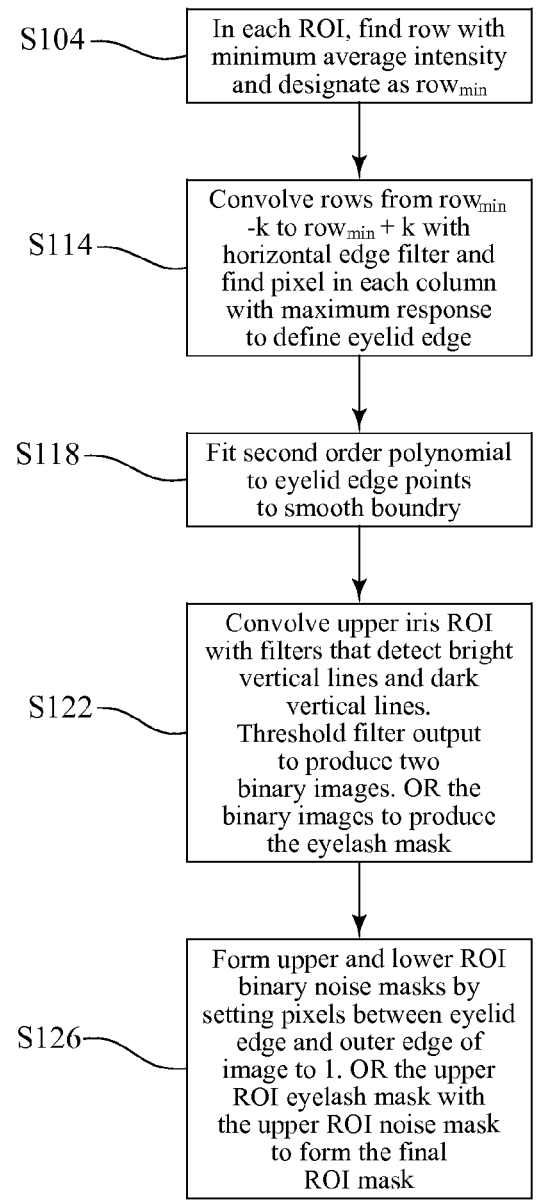
FIG. 12 is a flow chart of an exemplary method for detecting eyelids and eyelashes and creating a mask image so that such areas will not be used for matching purposes.

FIG. 12 is a flow chart of an exemplary method or process for performing step S102 (FIG. 2) detecting eyelids and eyelashes and creating a mask image so that such areas will not be used for matching purposes, and will be described with reference to FIG. 13 through FIG. 15.

Step S104 is, in each ROI, finding a row with a minimum average intensity and designating the row as $row_{min}$.

Figure 13:
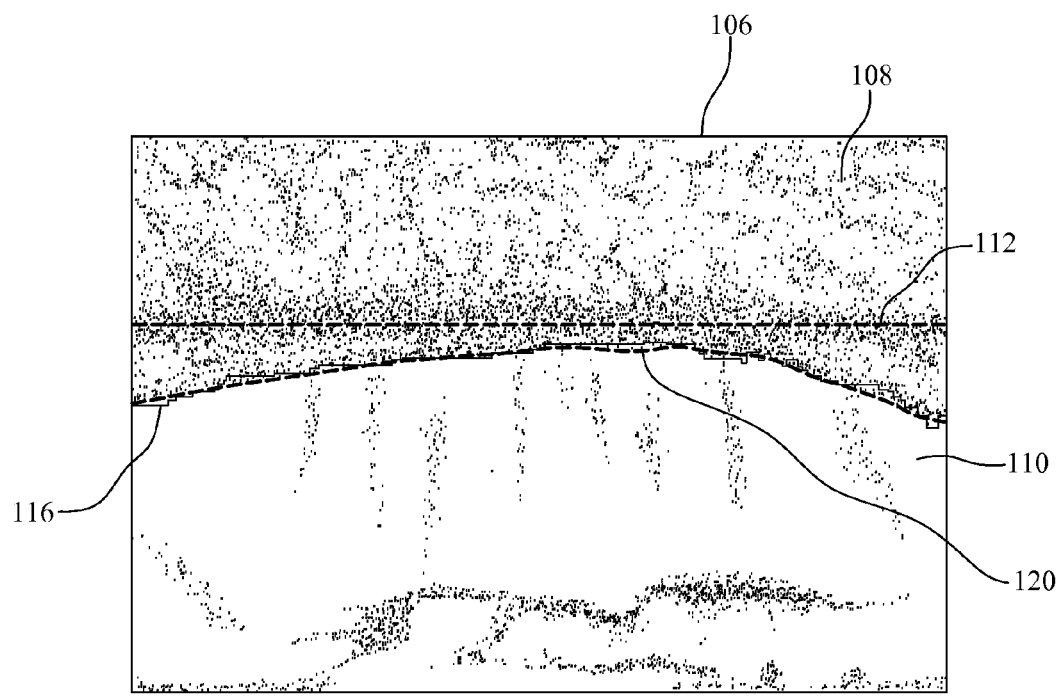
FIG. 13 is a schematic diagram of a set of pixel data representing the upper region of interest.

FIG. 13 is a schematic view of a set of pixel data representing the upper region of interest 106 including a portion of an eyelid 108 and a portion of an iris 110. Shown is a $row_{min}$ 112 which has a minimum average intensity.

Returning to FIG. 12, step S114 is convolving rows from $row_{min}$ to $row_{min}-k$ in the upper ROI, or from $row_{min}$ to $row_{min}+k$ in the lower ROI with a horizontal edge filter, and finding a pixel in each column with a maximum response to define a set of eyelid edge points. "k" is fraction of the ROI height. An exemplary value for k is 0.2 times the ROI height.

FIG. 13 shows a set of eyelid edge points 116 in the upper ROI resulting from the process of convolving rows from $row_{min}$ to $row_{min}+k$ with a horizontal edge filter.

Returning again to FIG. 12, step S118 is fitting a second order polynomial to the eyelid edge points to derive a smooth eyelid boundary.

FIG. 13 shows a smooth eyelid boundary 120 resulting from fitting a second order polynomial to the eyelid edge points 116.

Returning again to FIG. 12, step S122 is convolving the upper iris ROI data with filters that detect bright vertical lines and dark vertical lines, which represent eyelashes, and thresholding the filtered upper iris ROI data to produce an eyelash mask.

Figure 14:
FIG. 14 is a schematic diagram of an eyelash mask resulting from convolving a set of data representing the upper region of interest with filters that detect bright vertical lines and dark vertical lines, and thresholding the filtered data.

FIG. 14 show an eyelash mask 124 resulting from convolving the set of data representing the upper region of interest 106 (FIG. 13) with filters that detect bright vertical lines and dark vertical lines, and thresholding the filtered data.

Returning yet again to FIG. 12, step S126 is forming upper and lower ROI binary noise masks by setting pixels between the smooth eyelid boundary and the outer edge of the image to "1." Further, the upper region of interest mask is OR'd with the eyelid mask to form the final upper ROI mask.

Figure 15:
FIG. 15 is a schematic diagram of an exemplary upper ROI mask resulting from setting pixels between the smooth eyelid boundary and the edge of the image to "1" and forming the logical "OR" of the upper ROI mask and the eyelash mask.

FIG. 15 shows an exemplary upper ROI mask 128 resulting from setting pixels between the smooth eyelid boundary 120 (FIG. 13) and the edge of the image to "1" and OR'ing the image with the eyelash mask 124 (FIG. 14).

Thus, areas of the iris ROIs obscured by an eyelid can be delineated in a mask image so that such areas will not be used for matching purposes. The eyelid boundary is found through a process of edge detection. In addition, an eyelid detection algorithm, using spatial filtering followed by thresholding, is applied to the upper iris region. If eyelashes are found their location information is also added to the mask image.

The image information from the two iris ROIs is processed using log-Gabor wavelets (see: Masek, L., Recognition of human iris patterns for biometric identification, B. E., Thesis, School of Computer Science and Software Engineering, University of Western Australia, 2003; incorporated herein by reference), and the phase information associated with this complex transformation is encoded as a two-bit value for each pixel. The binary image that results constitutes a template that provides a compact representation of the iris texture features. Along with the template, a mask is generated that indicates which values in the template represent usable texture features, and which represent areas that are not useful for identification due to the presence of noise or obscuration by eyelids, eyelashes, etc.

Figure 16:
FIG. 16 is a schematic diagram of a typical template.
Figure 17:
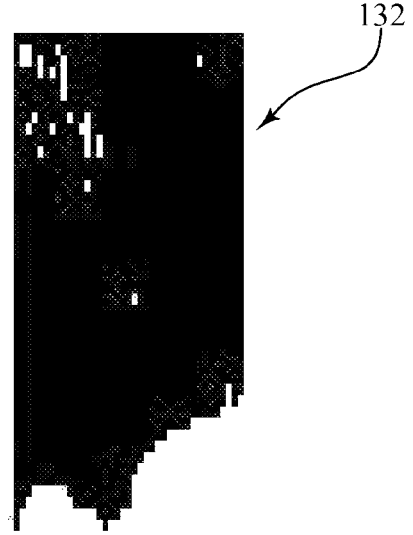
FIG. 17 is a schematic diagram of a typical mask.

FIG. 16 shows a typical template 130, and FIG. 17 shows a typical mask 132. The typical template 130 actually consists of two templates side-by-side, the left for the upper iris ROI and the right for the lower iris ROI. The template for the upper ROI is inverted so the edge corresponding to the pupil boundary is at the top and that corresponding to the eyelid is at the bottom. Note the regions at the bottom of the typical mask 132 where the mask pixels are set to "1" (white instead of black), and indicate areas where the iris is obscured by the eyelids.

Returning now to FIG. 2, the biometric recognition process consists of obtaining "reference" or "enrollment" templates and mask data for each eye of each animal to be identified at a future time. These templates and masks, such as those in FIG. 16 and FIG. 17, are placed in an enrollment database 18 (FIG. 1) along with other information that includes, minimally, a name or other identifier for the animal. When the identity of an animal is to be determined or verified, an image is captured from one or both eyes, and a template and mask are generated from each eye. There are two types of biometric recognition commonly used; in verification some claim of identity is provided on behalf of the animal ("this animal is Old Blue") and the recognition process consists of simply comparing a "presented" template and mask with the enrollment template and mask previously generated from "Old Blue" and stored in the enrollment database. If no claim of identity is made, then the presented template and mask are compared to every template/mask combination in the enrollment database in an effort to find a match. This latter process is called identification.

Step S134 is determining whether the image is to be enrolled in the enrollment database.

If so, then step S136 is re-sampling the ROIs and masks using default sampling intervals. Step S138 is encoding a template, as described above. Step S140 is enrolling the template and masks in the enrollment database 18 (FIG. 1).

However, if the image is to be used for verification or identification, then the next step is S142, verification or identification using templates and masks according to one of two exemplary methods described in more detail below. The two exemplary methods for verification or identification use "variable scale matching," described in more detail below, to overcome matching errors caused by pupil dilation.

In human iris recognition, the pupil boundary and outer iris boundary are both located, and the iris samples along the radial direction are automatically scaled so that the number of radial samples is constant regardless of pupil size. In the animal identification application, it is not usually possible to accurately locate the outer iris boundary; thus this automatic scaling cannot be performed. "Variable scale matching" as used herein, is the comparison of enrollment and presented templates, performed over a range of vertical scale factors that are applied to the ROIs extracted from the eye image. Variable scale matching can be performed in two ways.

A first method includes the steps of S144 generating arrays of horizontal sample intervals (i.e., scale factors) and vertical sample intervals (i.e., scale factors); S146 re-sampling all ROIs and masks using all possible combinations of sample intervals; S148 encoding a set of m×n ROIs to produce templates, and S150 arriving at a set of m×n recognition templates and m×n masks. In this method, the iris ROIs are sampled using a number of different vertical and horizontal scale factors, for example, ranging from approximately 75 percent to 125 percent of the nominal scale estimated from the pupil aspect ratio and the major axis length. A number of re-sampled iris ROIs are thus produced, and each is used to generate a template and mask as described above. Each of these template/mask combinations is then compared against the enrollment or reference template, and the best resulting match score is retained and compared against a threshold to reach a match decision.

A second method includes the steps of S152 encoding full-resolution templates; S154 generating arrays of horizontal sample intervals and vertical sample intervals; S156 re-sampling templates and masks using all possible combinations of sample intervals; and S158 arriving at a set of m×n recognition templates and m×n masks. Thus, this method consists of extracting a single set of iris ROIs and generating a template/mask pair from this single set. Prior to matching, the template and mask are re-sampled using a range of vertical and horizontal scale factors between approximately 75% and 125%, and the re-sampled template/mask pairs are then matched against the enrollment or reference template. The best resulting match score is retained and compared against a threshold to reach a match decision.

The comparison of presented templates to enrollment templates is performed by determining the number of bits that are valid in both templates (i.e. both mask values are zero), and have different binary values. The fraction of the compared bits that differ is called the Hamming Distance (HD), named after Richard Hamming, who introduced this measurement in a fundamental 1950 paper on error-detecting and error-correcting codes. If two templates are identical, their HD will be zero; if they differ in every bit location their HD will be 1.0.

Figure 18:
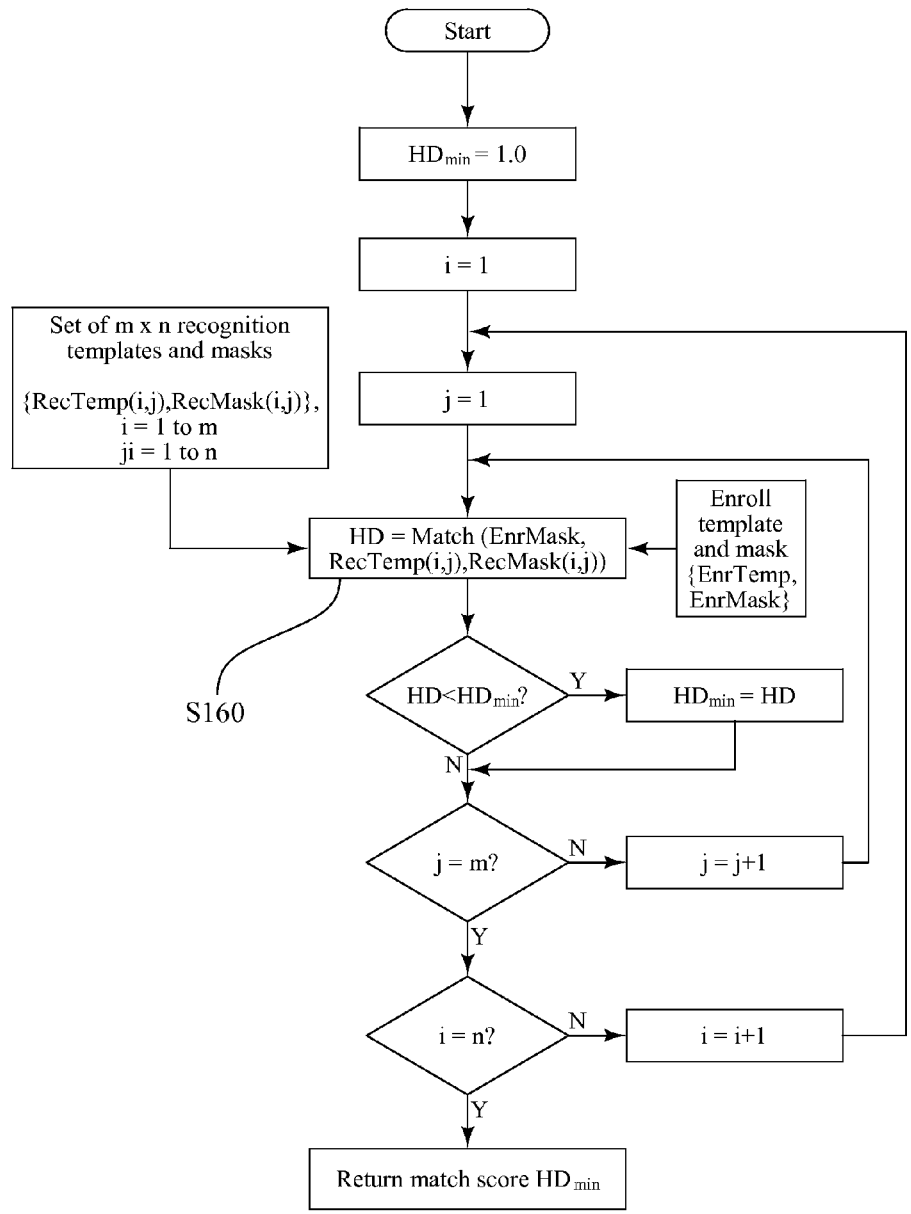
FIG. 18 is a flow chart showing matching multiple recognition templates to a single enrollment template and recording the lowest HD observed as the best match.

FIG. 18 shows step S160 matching multiple recognition templates to a single enrollment template and record the lowest HD observed as the best match.

Figure 19:
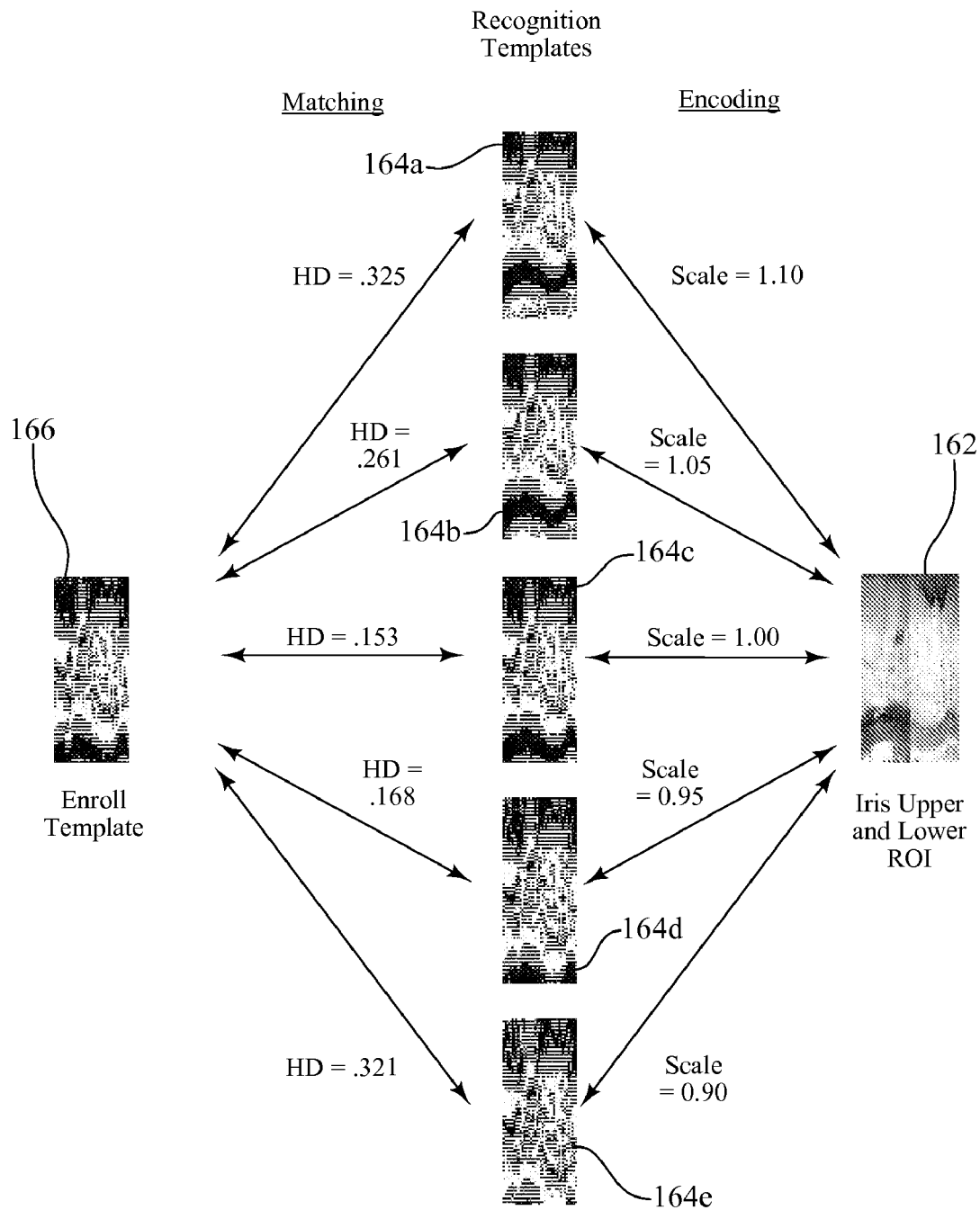
FIG. 19 is a schematic diagram of iris ROIs converted to recognition templates using a number of scale factors, and compared to an enrollment template.

FIG. 19 illustrates an example where iris ROIs 162 are either sampled using a number of scale factors and then converted to recognition templates 164a-164e, or are encoded as templates and the templates are sampled to produce the recognition templates 164a-164e. The recognition templates 164a-164e are then compared against an enrollment template 166. In practice, a HD of 0.25 or below would be considered a match. Thus, since two recognition templates 164c and 164d have a HD of less than 0.25, a decision that the animal from which the iris ROIs 162 were obtained is a match to the animal associated with the enrollment template 166.

It is noted that it is also possible to generate multiple enrollment templates, corresponding to different x and y scales, and match them against a single recognition template.

Typically an HD threshold can be defined such that if the HD is less than the threshold the templates can be declared to match, concluding that they were generated from the same eye. The HD threshold can be chosen by comparing the distributions of HD's from same-eye matches (called the authentics distribution) to distributions of HD's from different-eye matches (called the imposter distribution). Statistical models can be derived for these distributions that allow us to predict, for a particular HD threshold, the likelihood that a same-eye match will be mistakenly classified as an imposter and the likelihood that a different-eye match will be determined to be authentic. The former is called the false non-match rate (FNMR) and the latter the false match rate (FMR).

Thus, the invention provides a method and system for animal identification using iris images. One of ordinary skill in the art will recognize that additional steps and configurations are possible without departing from the teachings of the invention. This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

What is claimed is:

1. A method for animal identification, comprising:
    obtaining an image of an eye of an animal including a pupil region and an iris region;
    extracting a set of pixel data from the image, the set of pixel data representing a region of interest of the iris region of the eye; and
    transforming the set of pixel data representing the region of interest of the iris region of the eye into a template of the region of interest of the iris region of the eye, the template for use in identifying the animal;
    generating a plurality of comparison templates by:
        applying a plurality of scale factors to the set of pixel data representing the region of interest of the iris region of the eye to generate a plurality of re-sampled sets of pixel data representing the region of interest of the iris region of the eye; and
        generating a comparison template from each of the plurality of re-sampled sets of pixel data representing the region of interest of the iris region of the eye;
    determining a match score value for each comparison template by comparing each comparison template to a previously enrolled template of an eye of a previously identified animal; and
    determining whether the eye of the animal matches the eye of the previously identified animal by comparing at least one of the match score values to a match threshold value.

2. The method of claim 1, wherein the image of the eye includes a pupil having an irregular boundary, and wherein the method further comprises:
    determining the irregular boundary of the pupil;
    constructing a convex hull of the irregular boundary of the pupil; and
    using the convex hull of the irregular boundary of the pupil as a boundary of the pupil region in all subsequent operations.

3. The method of claim 2, further comprising performing successive image morphological closing operations on an area within the boundary of the pupil region until an Euler number representation of the pupil region is equal to one to eliminate internal holes in the pupil region.

4. The method of claim 1, wherein transforming the set of pixel data comprises:
    processing the set of pixel data from the image using log-Gabor wavelets in a complex transformation to produce phase information for each pixel of the set of pixel data; and encoding the phase information for each pixel of the set of pixel data as a two bit value for each pixel to produce a template that provides a compact representation of iris texture features.

5. The method of claim 1, further comprising:

detecting, if present, areas not to be used for matching purposes in each of the plurality of re-sampled sets of pixel data;

generating a comparison mask image of the areas not to be used for matching purposes from each of the plurality of re-sampled sets of pixel data; and using each comparison mask image and a previously enrolled mask image of the eye of the previously identified animal to select elements of each comparison template and the previously enrolled template that will contribute to the match score value.

6. A system for animal identification, comprising:

an image capture apparatus for obtaining an image of an eye of an animal including a pupil region and an iris region; and a template generation apparatus for:

extracting a set of pixel data from the image, the set of pixel data representing a region of interest of the iris region of the eye; and transforming the set of pixel data representing the region of interest of the iris region of the eye into a template of the region of interest of the iris region of the eye, the template for use in identifying the animal;

an enrollment database in communication with the template generation apparatus for:

receiving from the template generation apparatus the template of the region of interest of the iris region of the eye; and storing the template of the region of interest of the iris region of the eye along with information that includes an identifier for the animal; and a variable-scale matching apparatus in communication with the template generation apparatus and the enrollment database for:

generating a plurality of comparison templates by:

applying a plurality of scale factors to the set of pixel data representing the region of interest of the iris region of the eye to generate a plurality of re-sampled sets of pixel data representing the region of interest of the iris region of the eye; and generating a comparison template from each of the plurality of re-sampled sets of pixel data representing the region of interest of the iris region of the eye;

determining a match score value for each comparison template by comparing each comparison template to a previously enrolled template of an eye of a previously identified animal retrieved from the enrollment database; and determining whether the eye of the animal matches the eye of the previously identified animal by comparing at least one of the match score values to a match threshold value.

7. The system of claim 6, wherein the image of the eye includes a pupil having an irregular boundary, and wherein the template generation apparatus is further for:

determining the irregular boundary of the pupil;

constructing a convex hull of the irregular boundary of the pupil; and using the convex hull of the irregular boundary of the pupil as a boundary of the pupil region in all subsequent operations.

8. The system of claim 7, wherein the template generation apparatus is further for performing successive image morphological closing operations on an area within the boundary of the pupil region until an Euler number representation of the pupil region is equal to one to eliminate internal holes in the pupil region.

9. The system of claim 6, wherein the template generation apparatus is further for:

processing the set of pixel data from the image using log-Gabor wavelets in a complex transformation to produce phase information for each pixel of the set of pixel data; and encoding the phase information for each pixel of the set of pixel data as a two bit value for each pixel to produce a template that provides a compact representation of iris texture features.

10. The system of claim 6, wherein the template generation apparatus is further for:

detecting, if present, areas not to be used for matching purposes in each of the plurality of re-sampled sets of pixel data;

generating a comparison mask image of the areas not to be used for matching purposes from each of the plurality of re-sampled sets of pixel data; and using each comparison mask image and a previously enrolled mask image of the eye of the previously identified animal to select elements of each comparison template and the previously enrolled template that will contribute to the match score value.

11. A method for animal identification, comprising:

obtaining an image of an eye of an animal including a pupil region and an iris region;

extracting a set of pixel data from the image; and transforming the set of pixel data into a template, the template for use in identifying the animal;

generating a plurality of comparison templates by:

applying a plurality of scale factors to the set of pixel data to generate a plurality of re-sampled sets of pixel data; and generating a comparison template from each of the plurality of re-sampled sets of pixel data;

determining a match score value for each comparison template by comparing each comparison template to a previously enrolled template of an eye of a previously identified animal; and determining whether the eye of the animal matches the eye of the previously identified animal by comparing at least one of the match score values to a match threshold value.

12. The method of claim 11, wherein the image of the eye includes a pupil having an irregular boundary, and wherein the method further comprises:

determining the irregular boundary of the pupil;

constructing a convex hull of the irregular boundary of the pupil; and using the convex hull of the irregular boundary of the pupil as a boundary of the pupil region in all subsequent operations.

13. The method of claim 12, further comprising performing successive image morphological closing operations on an area within the boundary of the pupil region until an Euler number representation of the pupil region is equal to one to eliminate internal holes in the pupil region.

14. The method of claim 11, wherein transforming the set of pixel data comprises:
- processing the set of pixel data from the image using log-Gabor wavelets in a complex transformation to produce phase information for each pixel of the set of pixel data; and
- encoding the phase information for each pixel of the set of pixel data as a two bit value for each pixel to produce a template that provides a compact representation of iris texture features.

15. The method of claim 11, further comprising:
- detecting, if present, areas not to be used for matching purposes in each of the plurality of re-sampled sets of pixel data;
- generating a comparison mask image of the areas not to be used for matching purposes from each of the plurality of re-sampled sets of pixel data; and
- using each comparison mask image and a previously enrolled mask image of the eye of the previously identified animal to select elements of each comparison template and the previously enrolled template that will contribute to the match score value.

16. A system for animal identification, comprising:
- an image capture apparatus for obtaining an image of an eye of an animal including a pupil region and an iris region; and
- a template generation apparatus for:
  - extracting a set of pixel data from the image; and
  - transforming the set of pixel data into a template for use in identifying the animal;
- an enrollment database in communication with the template generation apparatus for:
  - receiving from the template generation apparatus the template; and
  - storing the template along with information that includes an identifier for the animal; and
- a variable-scale matching apparatus in communication with the template generation apparatus and the enrollment database for:
  - generating a plurality of comparison templates by:
    - applying a plurality of scale factors to the set of pixel data to generate a plurality of re-sampled sets of pixel data; and
    - generating a comparison template from each of the plurality of re-sampled sets of pixel data;
  - determining a match score value for each comparison template by comparing each comparison template to a previously enrolled template of an eye of a previously identified animal retrieved from the enrollment database; and
  - determining whether the eye of the animal matches the eye of the previously identified animal by comparing at least one of the match score values to a match threshold value.

17. The system of claim 16, wherein the image of the eye includes a pupil having an irregular boundary, and wherein the template generation apparatus is further for:
- determining the irregular boundary of the pupil;
- constructing a convex hull of the irregular boundary of the pupil; and
- using the convex hull of the irregular boundary of the pupil as a boundary of the pupil region in all subsequent operations.

18. The system of claim 17, wherein the template generation apparatus is further for performing successive image morphological closing operations on an area within the boundary of the pupil region until an Euler number representation of the pupil region is equal to one to eliminate internal holes in the pupil region.

19. The system of claim 16, wherein the template generation apparatus is further for:
- processing the set of pixel data from the image using log-Gabor wavelets in a complex transformation to produce phase information for each pixel of the set of pixel data; and
- encoding the phase information for each pixel of the set of pixel data as a two bit value for each pixel to produce a template that provides a compact representation of iris texture features.

20. The system of claim 16, wherein the template generation apparatus is further for:
- detecting, if present, areas not to be used for matching purposes in each of the plurality of re-sampled sets of pixel data;
- generating a comparison mask image of the areas not to be used for matching purposes from each of the plurality of re-sampled sets of pixel data; and
- using each comparison mask image and a previously enrolled mask image of the eye of the previously identified animal to select elements of each comparison template and the previously enrolled template that will contribute to the match score value.

* * * * *